July 5, 1938.    H. J. YOUNG    2,122,600
SHOWER MIXER
Filed Sept. 30, 1935
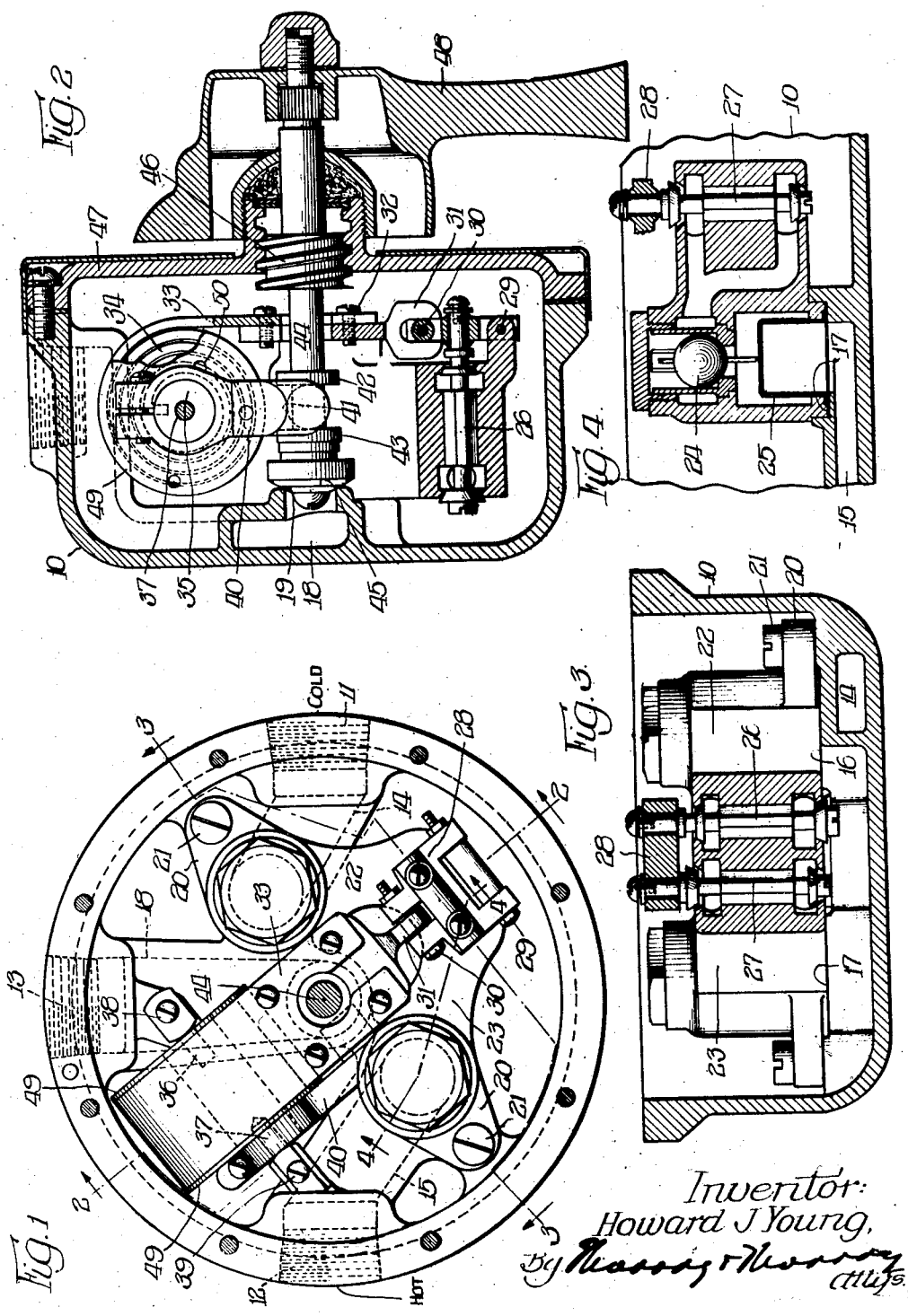
Inventor:
Howard J Young, Patented July 5, 1938

2,122,600

UNITED STATES PATENT OFFICE 2,122,600

SHOWER MIXER

Howard J. Young, River Forest, Ill., assignor to The Powers Regulator Company, Chicago, Ill., a corporation of Illinois Application September 30, 1935, Serial No. 42,733

9 Claims. (Cl. 236—12)

My invention relates to a device for automatically controlling the discharge temperature of intermixed hot and cold fluids.

An object of my invention is to provide a mixer of extremely simple construction and arrangement, and adapted to be economically manufactured; one that will not readily become out of order but which, in the event of the necessity for adjustment or replacement of parts, is readily accessible by the use of ordinary tools.

I have found it desirable for several reasons to utilize a coiled bimetal thermostatic element, not only for its permanency but for its simplicity in construction, installation and operation; furthermore, by the use of this type of thermostatic element I am able to construct a mixer without the use of any springs. The construction, likewise adapts itself to a most desirable form of control and regulation, in that I am able to utilize a single, manually controlled valve element for opening and closing the outlet passage from the mixer and for effecting the desired temperature regulation of the outgoing mixture.

As a further advantage in operation, I provide a balanced valve construction, so that the valve action is not affected by variations in the supply pressure. Other advantages and features of novelty will be pointed out hereinafter.

The invention will be more readily understood by reference to the accompanying drawing, in which, Fig. 1 is an elevation of a shower mixer constructed in accordance with my invention, the cover plate being removed;

Fig. 2 is a sectional view on the line 2—2 of Fig. 1, and

Figs. 3 and 4 are sectional views on the lines 3—3 and 4—4 of Fig. 1.

Referring to the drawing, it will be seen that there is provided a casing 10, having inlet openings 11—12 for cold and hot fluids respectively and an outlet 13 for mixed fluids. The opening 11 communicates with a cored passage 14, while the opening 12 communicates with a cored passage 15 which passages terminate in faced seats 16—17 respectively. The outlet 13 communicates with a cored passage 18 terminating in a valve seat 19 as best shown in Fig. 2.

The regulating mechanism includes a casting having ears 20 through which screws 21 are projected in order to secure the casting against the wall of the casing. The casting consists of a cored body having two hollow arms 22—23 with enlargements at their ends, the enlargements each containing a check valve 24 and a screen 25, the lower faces of the enlargements being shaped to fit the respective seats 16—17 on the casing. At the junction of the arms the passages terminate in outlets to the space within the casing, the outlets being controlled by parallel, reciprocating, balanced valves 26—27. It will be noted that the valves are oppositely faced and that when the valves are moved in unison one is opened as the other is closed. The upper ends of the valves are connected to a lever 28 fulcrumed on a pivot pin 29 and arranged as a lever of the second order. When properly adjusted, as shown in the drawing, the total flow of hot and cold fluids past the two valves is substantially uniform at all times; that is, as the flow of one fluid is increased the flow of the other fluid is correspondingly decreased and the volume of flow is unchanged by any manipulation of the hand controller, except by restricting the outlet opening to the point of use.

At the free end of the lever 28 is a pin and roller 30 adapted to be engaged by a yoke 31 fixed by means of screws 32 to the tangential end 33 of a coiled bimetal thermostatic element 34. In its inner end this element is bent to enter a slot in a core 35, the core being pivoted on short stub shafts 36—37, the outer ends of which are held by screws 38—39 on the wall of the casing. To a projecting portion of the core 35 is secured an arm 40 having a boss 41 thereon. This boss is intended to lie between the annular flanges 42—43 formed on a stem 44. On the inner end of the stem is mounted a valve 45 that controls the outlet passage 18 by cooperating with the valve seat 19. The stem is provided with threads 46 that engage with the threaded axial opening in the cover plate 47, while an adjusting handle 48 with a pointer adapted to cooperate with a dial in the usual manner, is provided for controlling the stem. It will be noted that the stem projects through an opening in the tangential end of the thermostatic member, the opening being sufficiently large to avoid any conflict between the two parts in their respective movements.

In operation it will be seen that on rotating the handle and stem the valve 45 is moved away from its seat permitting the passage of the requisite volume of cold water to a shower or other point of use. As the stem is moved outward under the action of the screw, the arm 40 is likewise moved and the core 35 is rotated, placing the thermostatic coil under a tension tending to cause its tangential end to close the cold water valve and open the hot water valve. As the temperature increases or fluctuates from that indicated by the setting, the bimetal coil will in due time correct the valve setting to restore the predetermined temperature for the outgoing fluid.

When the stem is rotated to close the outlet valve, the core of the thermostat is rotated, thus swinging the tangential end thereof and closing the hot fluid inlet (to the extent that it is at that time open) and correspondingly opening the cold fluid inlet. This does not change the total inlet area of the valves. It will be seen that the hot and cold fluids enter the chamber formed by the hollow interior of the casing from both sides of the casting; that is, past both of the valve seats—assuming that the respective valve is not entirely closed. Thus the fluids mix thoroughly and as the whole interior of the casing is filled with the mixed liquids, the thermostat is instantly affected by any change in the temperature. The arrangement of the thermostatic coil is such that the coil expands as the temperature is lowered and the tangential end moves angularly outward, tending to carry with it the arm 28 to which the valves are attached. The clearance in one direction between the yoke 31 and the pin and roller 30, together with the capacity for relative rotation permits the necessary adjustment of the end to the peculiar motion that follows a change of dimensions of the coil. In this manner I am able to translate the rotary motion of the coil to a motion that is sufficiently rectilinear to effect the necessary valve adjustment.

In order to avoid "hunting"—that is, constant motion of the valves, I provide the shield plates 49 on both sides of the coil, closing the open ends thereof and include one or more perforations 50, in the discs 49, as may be necessary to restrict the flow of water round the coil and thus retard the response of the thermostat to changes in temperature.

The device is sure and accurate in action, is substantially unaffected by changes in pressure and will operate through long periods without attention. If necessary to clean the screen or provide other minor repairs, it is only necessary to remove the handle and cover, then remove the screws 21—38—39, when the whole operating mechanism may be bodily lifted from the casing. By the removal of screws 21 the valve assembly casting can be removed without disturbing the thermostatic coil or operating stem.

Inasmuch as modifications will readily suggest themselves to others, I wish it understood that I am not to be limited except as indicated in the appended claims.

I claim:

1. In combination, a casing having inlets for hot and cold fluids and an outlet for the mixed fluids, a pair of parallel reversely positioned valves respectively controlling the entrance of hot and cold fluids to said casing; a lever of the second order connected to said valves whereby movement of said lever serves to open one valve to the extent that it closes the other valve, a thermostatic element within said casing and connected to said lever, a manually movable valve for controlling the outlet passage for the mixed fluids, and a connection between said manually movable valve and said thermostat for effecting adjustment of the thermostat, the movement of the thermostat by movement of said manually movable valve toward closing position serving to close the hot fluid inlet and open the cold fluid inlet.

2. In combination, a casing having inlets for hot and cold fluids and an outlet for the mixed fluids, a pair of reversely positioned valves respectively controlling the entrance of hot and cold fluids to said casing, a bimetal thermostat within said casing, an end of which thermostat is connected to said valves whereby movement of the thermostat serves to open one valve to the extent that it closes the other valve, a manually movable valve for controlling the outlet for the mixed fluids, and a connection between said manually movable valve and said thermostat for effecting adjustment of the thermostat, the movement of the thermostat by movement of said manually movable valve toward closing position serving to close the hot fluid inlet and open the cold fluid inlet.

3. In combination, a casing having inlets for hot and cold fluids and an outlet for the mixed fluids; a pair of reversely positioned valves respectively controlling the entrance of hot and cold fluids to said casing, a bimetal coiled thermostat pivotally mounted in said casing an end of which thermostat is connected to said valves, whereby movement of the thermostat serves to open one valve to the extent that it closes the other valve, a manually movable valve for controlling the outlet passage for the mixed fluids, and a connection between said manually movable valve and the pivot on which said thermostat is mounted for effecting adjustment of said thermostat, the movement of the thermostat by movement of said manually movable valve toward closing position serving to close the hot fluid inlet and open the cold fluid inlet.

4. In a mixer, a combination of a casing having inlets for hot and cold fluids and an outlet for the mixed fluids, balanced valve means controlling the entrance of hot and cold fluids to said casing, a thermostat coil pivotally mounted within the casing and connected to said inlet valve means at its free end, a manually movable valve for controlling said outlet passage, and means connecting said manually movable valve to the pivot for said thermostat whereby movement of said manually movable valve serves to change the adjustment of said thermostat by rotating the same on its pivot, the movement of the thermostat by movement of said manually movable valve toward closing position serving to close the hot fluid inlet and open the cold fluid inlet.

5. In combination, a casing having inlets for hot and cold fluids and an outlet for the mixed fluids, balanced valve means for controlling the entrance of hot and cold fluids to said casing, a coiled bimetal thermostat within said casing, a tangential end of which is connected to said valve means whereby movement of said valve means by said thermostat serves to open one valve to the extent that it closes the other valve, said thermostat being mounted for rotation on its axis, a manually movable valve having a stem for controlling the outlet for the mixed fluids and a connection between said stem and the mounting for said thermostat whereby movement of said stem tends to rotate said thermostat, the movement of the thermostat by movement of said manually movable valve toward closing position serving to close the hot fluid inlet and open the cold fluid inlet.

6. In combination, a casing having inlets for hot and cold fluids and an outlet for the mixed fluids, a pair of parallel reversely positioned valves for controlling the entrance of hot and cold fluids to said casing, a coiled bimetal thermostat within said casing, a tangential end of which is connected to said valves whereby movement of said valves by said thermostat serves to open one valve to the extent that it closes the other valve, said thermostat being mounted for rotation on its axis, a manually movable valve having a stem for controlling the outlet for the mixed fluids and a connection between said stem and the mounting for said thermostat whereby movement of said stem tends to rotate said thermostat, the movement of the thermostat by movement of said manually movable valve toward closing position serving to close the hot fluid inlet and open the cold fluid inlet.

7. In combination, a casing having inlets for hot and cold fluids and an outlet for the mixed fluids, valve means for controlling the entrance of hot and cold fluids to said casing, a coiled bimetal thermostat within said casing, a tangential end of which is connected to said valve means whereby movement of said valve means serves to open one valve to the extent that it closes the other valve, said thermostat being mounted for rotation on an axial pivot, a manually movable valve having a stem for controlling the outlet passage for the mixed fluids, said valve stem being threaded and mounted within the casing, an arm connected to the pivot for said thermostat, said arm being connected to the manually movable valve stem whereby axial movement of the stem to open and close the outlet tends to rotate said thermostat and effect adjustment thereof, the movement of the thermostat by movement of said manually movable valve toward closing position serving to close the hot fluid inlet and open the cold fluid inlet.

8. In a shower mixer, the combination with a casing, having valves for controlling the entrance of hot and cold fluids, a coiled bimetal thermostat for controlling the position of said valves, and means partially covering the open ends of said coiled thermostat whereby to shield the thermostat and retard its action under the influence of the temperature of the fluids passing through the casing.

9. In combination, a casing having hot and cold fluid inlets and a mixed fluid outlet, balanced valves controlling the hot and cold fluid inlets to the casing, a coiled bimetal thermostat within the casing, said coil having a tangential end directly connected to said valves for operating the same, a shut-off valve for controlling the outlet of the mixed fluids from the casing, said valve having a stem, said thermostat being mounted on a core for rotation and means connecting said stem and said core whereby longitudinal movement of the stem effects rotation of said core for changing the adjustment of said thermostat and swinging the tangential end thereof to change the positions of said valves.

HOWARD J. YOUNG.